No. 625,277. Patented May 16, 1899.
E. R. & W. T. SPEER & E. E. HYATT.
BREEDING AND OPERATING CRATE.
(Application filed Sept. 3, 1898.)

(No Model.)

Witnesses,
E. E. Carr.
Mary E. Carr.

Eben R. Speer,
William T. Speer, } Inventors.
Elmer E. Hyatt,

By Robert S. Carr, Atty.

THE NORRIS PETERS CO., PHOTO-LITHO., WASHINGTON, D. C.

UNITED STATES PATENT OFFICE.

EBEN R. SPEER, WILLIAM T. SPEER, AND ELMER E. HYATT, OF WOODLAWN, OHIO, ASSIGNORS, BY DIRECT AND MESNE ASSIGNMENTS, TO JOHN C. RINER, OF GRATIS, AND ALBERT KREKLER, OF WEST ELKTON, OHIO.

BREEDING AND OPERATING CRATE.

SPECIFICATION forming part of Letters Patent No. 625,277, dated May 16, 1899.

Application filed September 3, 1898. Serial No. 690,215. (No model.)

*To all whom it may concern:*

Be it known that we, EBEN R. SPEER, WILLIAM T. SPEER, and ELMER E. HYATT, citizens of the United States, residing at Woodlawn, in the county of Hamilton and State of Ohio, have invented certain new and useful Improvements in Breeding and Operating Crates, of which the following is a specification.

Our invention relates to breeding and operating crates of the class used by stock-breeders; and the objects of our improvement are to provide such details of construction and aggregation of parts as to adapt the crates to a wide range of purposes, like the ringing, castrating, breeding, and trimming the hoofs of hogs or other animals. These objects are attained in the following-described manner, as illustrated in the accompanying drawings, in which—

Figures 1, 2:
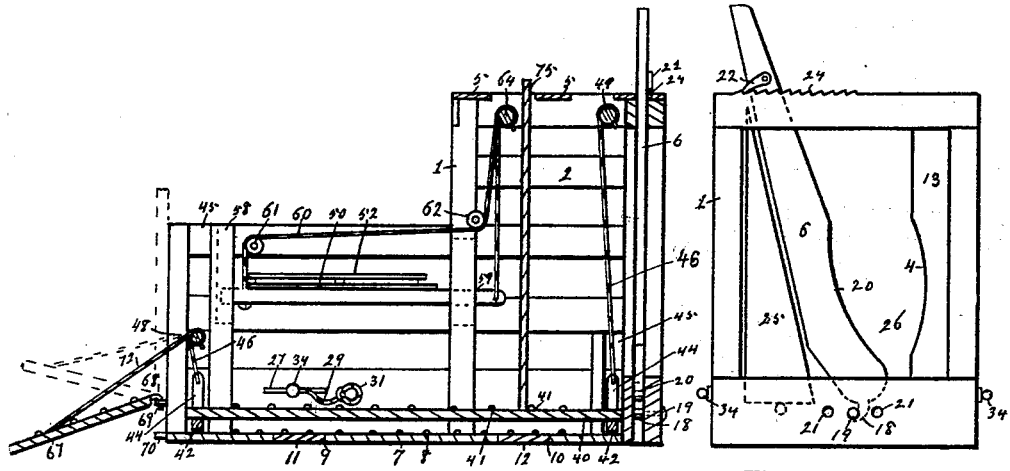
Figures 3, 4:
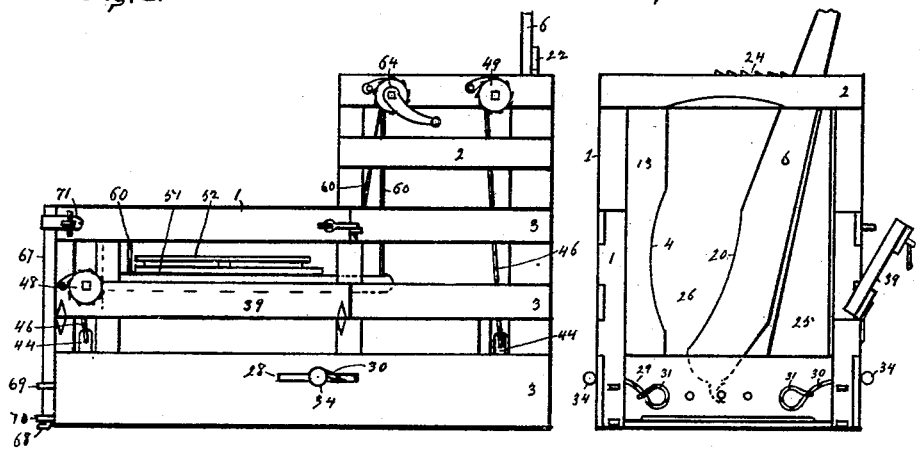
Figures 5, 6, 7:
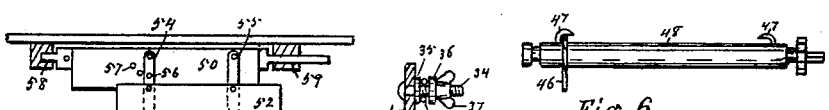

Figure 1 is a longitudinal sectional elevation of the crate as used for breeding; Fig. 2, a front elevation; Fig. 3, a side elevation; Fig. 4, a rear elevation; Fig. 5, the expansible supporting-shelf; Fig. 6, one of the rollers detached, and Fig. 7 a clamping-bolt.

In the drawings, 1 represents the body portion of the crate, of rectangular form and having its front portion 2 higher than the rear open portion. The sides of the crate are formed of horizontal strips 3, secured to vertical posts and at such distance apart as to leave spaces between them for the insertion therethrough of the operator's hand. The top of the front portion is closed by similar slats 5, secured transversely and with corresponding spaces between them. The permanent bottom 7 is formed solid and provided with transverse strips or cleats 8 on its top surface to prevent the feet of an animal standing thereon from slipping. Similar openings 9 and 10, formed in the middle and toward opposite ends of the bottom 7, are sufficiently large to permit the insertion of the operator's hands therethrough to trim the hoofs or toes of the respective rear and front feet of an animal within the crate and when it is turned over on its side. Removable doors 11 and 12 serve to close the respective openings, and they may be fastened in place by buttons (not shown) or by any of the usual fastening devices.

Board 13 closes a portion of one side of the front end and is formed with a concave recess 4 in the edge of its lower portion. Hand-lever 6 is movable in a transverse slot 17 in the top of the crate and is formed with hook 18 on its lower end to detachably engage with bolt 19 within slot 20, formed in the bottom portion of the frame. The bottom of the lever is adjustable more or less near to the board 13 by means of the bolt 19 being inserted through the different holes 21. A concave recess 20 is formed in the edge of the lever contiguous to and adapted to register with recess 4 in board 13. Pawl 22 on the lever engages with rack 24 on the top of the crate to hold the lever immovable when adjusted to the neck of an animal within the opening 26, formed by recesses 4 and 20, to hold it securely with its head outside of the crate while a ring may be inserted in its nose.

By disengaging the hook 18 of the lever from the pivot-bolt 19 the lever may be removed upwardly through the slots and from the crate. Board 25 may be removed in like manner to permit the animal to pass out through the front end of the crate. Said board 25 is dropped loosely through slot 17, with its lower end resting in slot 20 to close the space behind the lever and properly direct the animal's head through the opening 26.

Slots 27 and 28 are formed in the bottom side strips of the crate, the slot on the right side being located farther forward than the other. Cords 29 and 30 are inserted within the crate through the respective slots and each terminates in a noose or slip knot 31, to respectively engage with the hind legs of the animal while its neck is secured in opening 26. The right leg may be pulled forward and the left leg backward and against the sides of the crate by drawing the cords through the slots and there held in position by a turn of the cords around the corresponding bolt 34 and clamped between washers 35 and 36 thereon by means of thumb-nuts 37. Said bolts are adjustable along the slots to adapt them to the proper position for animals of different size. When the animal is secured by the neck and hind legs in this manner, the crate may be turned down on its left side and hinged gate 39, that forms a portion of the right side of the crate, opened outward. Complete access is now given to the operator to castrate or spay the animal while it is held securely in the proper and convenient position. When the operation is completed, the crate and animal are replaced in an upright position, the legs are released from the cords, board 25 and the hand-lever 6 are removed, and the animal is permitted to pass out of the crate.

Removable bottom 40, with transverse cleats 41 on its upper surface to prevent the animal's feet from slipping, is adjustably supported within the crate by stirrups 42 under its respective ends. Each end of the stirrups terminates in a vertical slide 44, that is movable in a corresponding groove 45 in the sides of and near the ends of the crate. Cords 46, secured to the respective slides, are detachably engaged with corresponding hooks 47 on the adjusting-rollers 48 and 49, that are journaled in the sides and near opposite ends of the crate. Each roller is provided with a pawl and ratchet-wheel to maintain in an elevated position and with an animal thereon the bottom 40 suspended therefrom. Roller 48 may be lifted from its bearings and removed from the crate or quickly replaced therein when desired.

Similar shelves 50 and 51 project within the crate from its respective sides and are each expansible in width by means of member 52 being carried parallel with its base through a horizontal arc on pivoted straps 54 and 55. A pin may be inserted through hole 56, formed in one of the straps, and in one of a series of holes 57, formed in the base and with which it registers, to secure the shelf in any position of width desired. The ends of the base of each shelf are formed to slide in corresponding vertical grooves 58 and 59, formed in the framework of each side of the crate. Grooves 58 are open at the top to permit the shelves to be easily removed or replaced in position therein. A single cord 60 of the proper length is secured by its ends to the respective ends of the base of each shelf, and after being passed over and under the respective sheaves 61 and 62 on the corresponding side of the frame is detachably engaged with a hook 47 on adjusting-roller 64. Said roller is provided with a pawl and ratchet-wheel and is similar to rollers 48 and 49. Removable crank 65 serves to actuate all the rollers separately. By turning roller 64 both shelves are elevated simultaneously without changing their horizontal position, and they serve to assist in supporting the sides of and steadying a breeding animal placed in the crate and between them.

Tail-gate 67 contains transverse cleats on its top or inside surface to prevent an animal's hind feet from slipping, and is provided with hooks 68 to detachably hinge in either of the corresponding pair of staples 69 or 70 in the sides of the crate. To close the rear end of the crate, it is preferably hinged in the bottom pair of staples and fastened to the sides of the crate by suitable hasps 71. By hooking said tail-gate in the top pair of staples it may be caused to swing in a vertical arc and supported at any position therein by means of cords 72, secured to its edges and detachably engaging with the corresponding hooks 47 on the removable adjusting-roller 48, cords 46 being detached therefrom.

Removable board or partition 75 may be inserted through either of the spaces between the slots 5 on the top of the front portion of the crate and with its lower end resting against a transverse cleat on either the removable bottom or (during its absence) the permanent bottom of the crate. By means of this board being placed against the nose of an animal in the crate the position of the rear extremity of animals of different lengths may be caused to occupy approximately the same position in relation to the tail-gate.

For breeding purposes the difference in height between the male and female animals may be compensated for by the proper vertical adjustment of the tail-gate or of the movable bottom of the crate on which they are respectively supported during the act of coition.

Having fully described our improvement, what we claim as our invention, and desire to secure by Letters Patent, is—

1. In a breeding and operating crate, the combination with an adjustable clamping device located in its front end and adapted to securely hold the neck of an animal of clamping-bolts adjustable in slots formed in the respective sides and near the bottom of the crate, and cords terminating in loops or slip-knots at one end and means of securing said cords to the bolts.

2. In a breeding and operating crate, the combination with a false bottom and a detachably-hinged tail-gate of separate mechanism to elevate said bottom and gate for the purpose specified.

3. In a breeding and operating crate, the combination with an adjusting-roller of horizontally-expansible shelves within the crate and cords adapted to engage the shelves with the roller whereby the shelves may be simultaneously elevated through different horizontal planes.

4. In a breeding and operating crate, the combination with the vertically-adjustable shelves projecting inwardly from its respective sides of a removable partition in the front portion of the crate and rearwardly adjustable therein for the purpose set forth.

EBEN R. SPEER.
WM. T. SPEER.
ELMER E. HYATT.

Witnesses:
ROBERT S. CARR,
R. Q. SURFACE.